(12) United States Patent
Colvin et al.

(10) Patent No.: US 6,974,402 B2
(45) Date of Patent: Dec. 13, 2005

(54) LAUNCH CONTROL OF HYBRID ELECTRIC VEHICLE HAVING A TORQUE CONVERTERLESS DRIVELINE

(75) Inventors: Dan Colvin, Farmington Hills, MI (US); Walt Ortmann, Saline, MI (US); Marvin Kraska, Dearborn, MI (US); Michael Encelewski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 10/780,337

(22) Filed: Feb. 17, 2004

(65) Prior Publication Data

US 2005/0181907 A1 Aug. 18, 2005

(51) Int. Cl.[7] ............................................. B60K 41/02
(52) U.S. Cl. ........................................................ 477/5
(58) Field of Search ................................. 477/5, 6, 175

(56) References Cited

U.S. PATENT DOCUMENTS

| | | | |
|---|---|---|---|
| 4,732,246 A | * | 3/1988 | Tateno et al. .................. 477/78 |
| 6,176,808 B1 | | 1/2001 | Brown et al. |
| 6,217,479 B1 | * | 4/2001 | Brown et al. |
| 6,227,999 B1 | * | 5/2001 | Wheeler ....................... 477/174 |

* cited by examiner

*Primary Examiner*—Dirk Wright
(74) *Attorney, Agent, or Firm*—David B. Kelley; MacMillan, Sobanski, Todd

(57) ABSTRACT

A powertrain assembly for an automotive vehicle having an internal combustion engine, transmission, electric induction motor, a clutch for connecting and releasing the engine and transmission, and a controller for controlling the state of engagement and disengagement of the clutch and the torque produced by the motor during the launch. The engine increases torque produced by the induction motor during a vehicle launch condition, permitting the engine to be turned off when the vehicle is at rest. The torque multiplication that would normally be available from a hydrokinetic torque converter is replaced with auxiliary launch torque supplied by the induction motor.

22 Claims, 7 Drawing Sheets

Figure 1
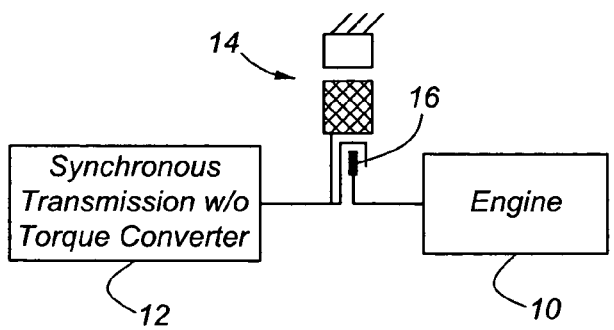
Figure 3
| Gear | 40 | 28 | 26 | 38 | 2/4 Band |
|------|----|----|----|----|----------|
| 1st  |    | X  |    | X  |          |
| 2nd  |    | X  |    |    | X        |
| 3rd  |    | X  | X  |    |          |
| 4th  |    |    | X  |    | X        |
| REV  | X  |    |    | X  |          |
Figure 5
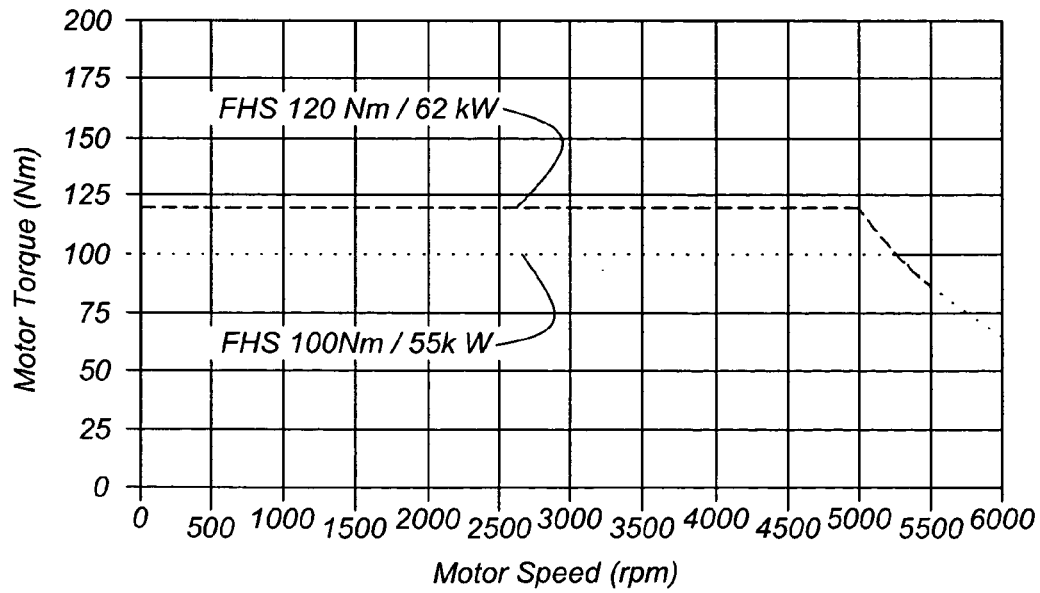

LAUNCH CONTROL OF HYBRID ELECTRIC VEHICLE HAVING A TORQUE CONVERTERLESS DRIVELINE

BACKGROUND OF THE INVENTION

1. Field of the Invention

The invention relates to hybrid vehicle powertrains in which an electric motor and an internal combustion engine provide power to a transmission having no torque converter.

2. Description of the Prior Art

In a automotive vehicle powertrain that includes a transmission, a hydrokinetic torque converter is conventionally located between the engine shaft and transmission input, the torque converter increasing engine torque during launch to provides a powerful launch feel to the driver during acceleration from a stop. The impeller of the torque converter receives engine torque and the turbine of the torque converter transfers torque to the torque input element of multiple-ratio gearing of the transmission.

The presence of the torque converter in the torque flow path introduces hydrokinetic power losses, particularly during startup of the vehicle, as the torque converter fluid in the converter torus circuit is accelerated and decelerated. These losses are manifested in heat loss to the hydrokinetic fluid, which requires a heat exchanger to maintain an acceptable hydrokinetic fluid temperature.

Attempts have been made to eliminate the power losses inherent in a powertrain having an internal combustion engine and a torque converter automatic transmission by replacing the engine with an electric motor and by replacing the torque converter by a clutch. The power output of the motor is connected to the clutch, which is connected to the transmission input. However, replacing the torque converter in this way has met with limited success because of the lack of acceleration at launch, i.e. when accelerating the vehicle from a stop.

Attempts to combine the advantages of an internal combustion engine with an electric motor drive have been made in hybrid vehicle arrangements, but the engine is required in such known designs to operate throughout a large speed range including startup speeds and to operate at idle speed while the vehicle is at rest.

In a hybrid gas-electric vehicle with a pre-transmission motor, it is highly desirable to eliminate the torque converter to minimize transmission losses. An electric torque convertless transmission has been designed to address drivability concerns while minimizing losses. That transmission uses a base power-shifting transmission with standard gear ratios, removes the torque converter, and places a high voltage motor on the transmission input. Without the torque converter, the launch for the transmission is accomplished by actively controlling the existing planetary clutches and the electric motor. A control system for coordinating the clutch and motor to provide acceptable launch feel is required.

SUMMARY OF THE INVENTION

The transmission and control system of this invention are particularly adapted for use with a hybrid electric vehicle including an internal combustion engine and a multiple-ratio transmission wherein provision is made for significantly improving fuel economy and reducing exhaust gas emissions.

It is an objective to provide an improved hybrid electric vehicle transmission and control system that permits the internal combustion engine to be deactivated when the vehicle is at rest. The improved driveline includes an induction motor that is useful to provide added launch performance, and which permits the multiple-ratio transmission to operate throughout a desired ratio range without the need for using a hydrokinetic torque converter between the engine and the transmission input.

The absence of a hydrokinetic torque converter from the hybrid electric vehicle driveline of the invention does not result in undesirable torsional vibration since the induction motor situated between the engine and the transmission may function as a vibration damping structure.

A input clutch also disconnects the engine from the torque path when the engine is required to operate at low throttle and during operation of the vehicle at low speed when only the induction motor is used to power the vehicle. It is at this time that the internal combustion engine is most inefficient. Thus, by disconnecting the engine, the engine may be reserved for operation in the speed range at which it is most efficient as the induction motor supplies the driving torque.

The clutch may be used also to rapidly restart the engine when the vehicle is moving by using the vehicle momentum since the engine is connected mechanically through the clutch to the transmission input.

The torque output of the induction motor can be optimized by maintaining the engine speed at a lower level than that which would be the case with a conventional automatic transmission having a torque converter. The launch performance is improved compared to a driveline with a conventional transmission because the output torque increases more rapidly during launch of the vehicle when the electric motor is used for launch purposes.

Various objects and advantages of this invention will become apparent to those skilled in the art from the following detailed description of the preferred embodiment, when read in light of the accompanying drawings.

In realizing these advantages, a method according to this invention for controlling during launch a vehicle powertrain is applicable to an assembly that includes a transmission having an input speed, an internal combustion engine having an output and a throttle position, and an input clutch having a variable torque capacity for driveably connecting the input and output. The method includes the steps of determining a current input speed, determining a value representing requested powertrain output, producing an indication that a vehicle launch condition has been initiated, determining a target input speed based on the value representing requested powertrain output, determining a variable pressure for actuating the input clutch during the launch condition based on a difference between the current input speed and the target input speed, and using the variable pressure to control the torque capacity of the input clutch during the launch condition.

Torque produced by the motor during launch further includes the steps of determining the current gear in which the transmission is operating, determining a target motor output torque based on the current gear and throttle position, and using the target motor output torque to control the torque produced by the motor.

BRIEF DESCRIPTION OF THE DRAWINGS

FIG. 1 is a schematic representation of a vehicle driveline including an engine, starter/generator or motor, input clutch, and automatic transmission;

FIG. 3 is a chart showing the engaged and disengaged state of the clutches and brakes of the transmission of FIG. 2, each state corresponding to a gear ratio produced by the transmission;

FIG. 5 is a graph illustrating the variation of output torque vs. motor speed for a motor suitable for use with the control of this invention;

DETAILED DESCRIPTION OF THE PREFERRED EMBODIMENT

Figure 2:
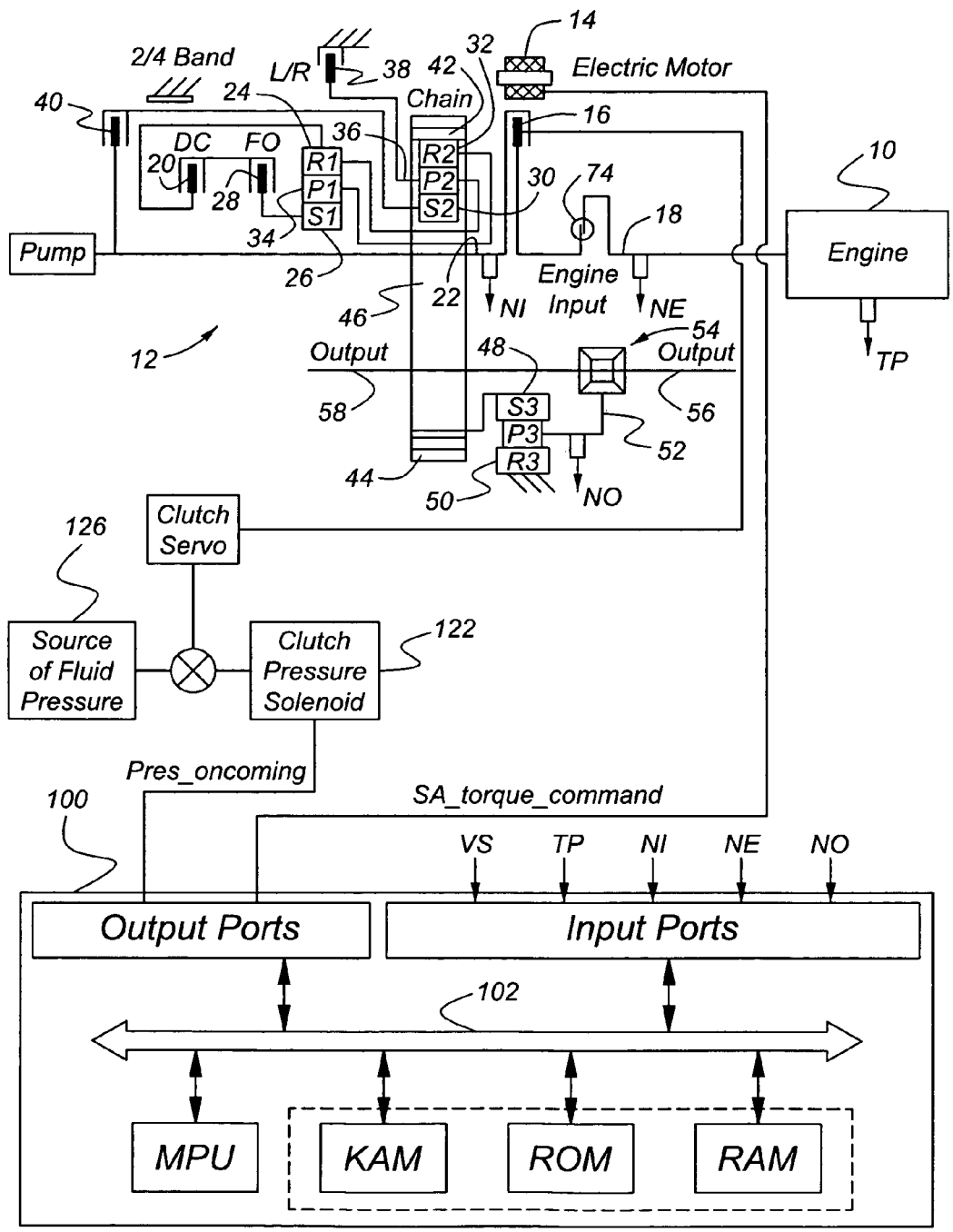
FIG. 2 is a schematic diagram showing transmission gearing, gear control elements, input clutch, electric motor, a controller.

Referring now to the drawings, there is illustrated in FIG. 1 a gasoline-electric hybrid vehicle driveline that includes an internal combustion engine 10, a multiple-ratio vehicle transmission 12, an induction motor 14 located in a drive path between the engine and transmission 12, and a friction clutch 16 located between the engine and the motor for driveably connecting and disconnect the engine and transmission. The rotor of the induction motor is connected directly to the torque input element of the multiple-ratio synchronous transmission. It is connected also to the engine crankshaft 10 through the friction clutch 16.

FIG. 2 is a schematic representation of the gearing and control elements for the transmission of FIG. 1. The input shaft of the transmission is connected to the torque input side of the clutch 16. The electric motor is arranged so that it transmits torque in parallel relationship with respect to the engine torque input. The direct clutch (DC) shown at 20 connects transmission input shaft 22 to the ring gear 24 of a first simple planetary gear unit. Sun gear 26 of the simple planetary gear unit is connected through a forward clutch (FC) shown at 28 to the shaft 22. Ring gear 24 is connected to sun gear 30 of a second planetary gear unit. The ring gear 32 of the second planetary gear unit is connected to the planetary carrier 34 of the first planetary gear unit. The planetary carrier 36 for the second planetary gear unit is braked selectively by low-and-reverse brake (L/R) 38. Transmission input shaft 22 is connected through reverse clutch (RC) 40 to the sun gear 30 and is engaged during the first ratio drive operation. The brake 38, during reverse drive operation, anchors planetary carrier 36.

FIG. 3 is a chart, which illustrates the state of the clutches and brakes of the transmission 12 for each of the gear ratios. First gear is achieved by engaging the forward clutch and the low-and-reverse brake. Second forward drive ratio is achieved by engaging the forward clutch and the 2/4 band brake. Direct drive or third drive ratio is achieved by simultaneously engaging the forward clutch and the direct clutch, and fourth ratio or overdrive ratio is achieved by engaging the direct clutch and the 2/4 band brake. Reverse clutch 40 and low-and-reverse brake 38 are engaged during reverse drive operation.

The ring gear 32 acts as a torque output element for the gearing. It defines a sprocket wheel 42, which drives a sprocket wheel 44 by means of a drive chain 46 engaged with both sprocket wheels. Sprocket wheel 44 drives the sun gear 48 of the final drive gear unit. The ring gear 50 of the final drive gear unit is anchored, and the planetary carrier 52 brings torque output to differential gearing 54, which transfers driving torque to each of two axle half shafts 56 and 58.

Figure 4:
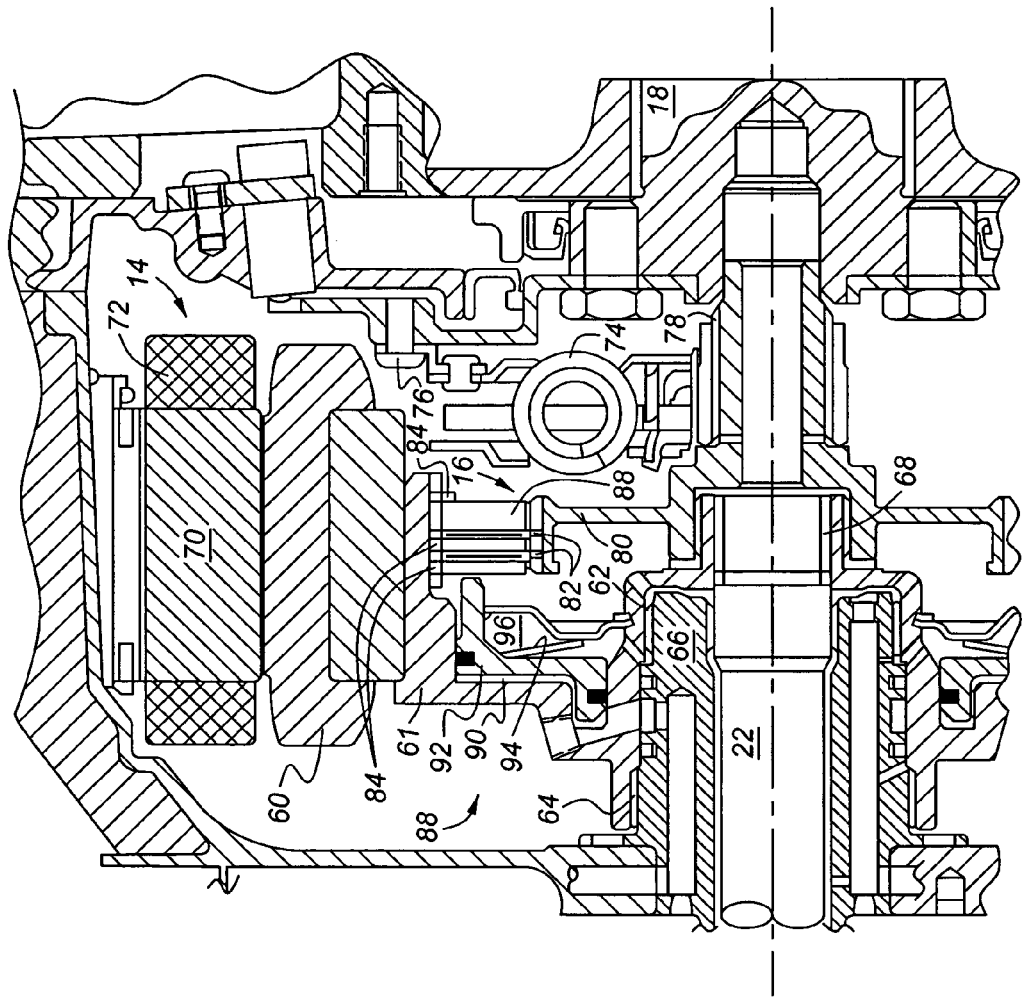
FIG. 4 is a partial cross section of a vehicle driveline assembly showing the arrangement of an engine crankshaft, starter/generator, input clutch, torsion damper and transmission input.

FIG. 4 is a detailed cross sectional view of the electric induction motor 14, a starter/alternator, engine crankshaft 18, and transmission input shaft 22. The induction motor 14 includes a rotor 60 supported on a rotor hub 61, which is supported by needle bearing 62, 64 on a sleeve shaft 66, surrounding the transmission input shaft 22. The rotor 60 and rotor hub 61 are continually driveably connected to input shaft 22 by a spline connection 68. Surrounding rotor 60 is a motor stator 70, which includes stator windings 72, the stator and winding being fixed to a casing against rotation.

A second torque delivery path connects the engine shaft 18 and input shaft 22, and is arranged in parallel with the path from the motor 14 to input shaft 22. The second path includes a torsion damper 74, connected by bolts 75, 76 to the engine shaft. The damper 74 is connected by a spline 78 to a disc 80, on which the input or start-up clutch 16 is supported. When clutch 16 is disengaged, the engine 10 is disconnected from the input shaft 22, and the induction motor is the only source of positive torque for the transmission 12. The clutch 16 disengaged during vehicle launch at low-throttle operating conditions when the induction motor is capable of providing sufficient torque to propel the vehicle. The engine, which may be inoperative during low-speed operation, can be rapidly restarted merely by engaging the clutch 16 and actuating the engine ignition system.

The input clutch 16 includes a set of friction discs 82, splined to the radially outer surface of disc 80. Interleaved with discs 82 are spacer plates 84, splined to the radially inner surface of rotor hub 61, and a blocker ring, secured to hub 61 by a snap ring 84 to limit axial displacement of the blocker ring and of the friction discs and spacer plates. Clutch 16 is controlled by a servo 88, which includes a hydraulic cylinder 90, a sealed piston 92 located in the cylinder, a Belleville return spring 94, and balance dam 96. The cylinder is pressurized and vented through passage 98. When the servo is pressurized, piston 92 moves rightward, forcing the discs 82 and plates 84 into mutual frictional contact, thereby driveably connecting the rotor hub 61 and the engine shaft 18. Clutch 16 is disengaged by venting cylinder 90, which allows spring 94 to push piston 92 away from the discs 82 and plates 84, thereby disconnecting the engine shaft 16 and rotor hub 61.

The control strategy of this invention can be applied to a powertrain in which clutch 16 is deleted, and the forward clutch 28 and low-and-reverse brake 38 are controlled instead according to this invention during vehicle launch conditions. In this case, vehicle launch is controlled through operation of the forward clutch 28 during vehicle forward launch and of the low-and-reverse brake 38 during vehicle reverse launch, in the same manner as will be described with reference to clutch 16. As in the case of the configuration of FIG. 1, in a system in which the forward clutch 28 and low-and-reverse brake 38 operate under control of the present invention to produce vehicle launch, the torque converter of the transmission is eliminated, and the induction motor improves launch performance in the absence of the torque converter.

A controller 100 receives signals generated by sensors, processes, and uses the input signals to determine the magnitude of pressure to be applied to clutch 16 in accordance with a clutch control strategy. Based upon this determination, the controller generates a command signal that causes the torque capacity of the clutch 16 to change, whereby the clutch slips, fully engages or fully disengages. The magnitude of clutch pressure establishes the magnitude of torque transmitted by the clutch 16. The controller also determines and command the magnitude of torque to be produced by the motor 12 by controlling the magnitude of current to by applied to the field windings of the motor.

In the preferred embodiment, the controller 100 is a powertrain controller that includes one or more digital microprocessors or digital computers, which cooperatively perform calculations, and execute subroutines and control algorithms. Controller 100 preferably generates a pulse width modulated (PWM) command or output signal, which controls the amount of slippage between the friction discs and spacer plates of clutch 16, thereby controlling the relative magnitudes of torque and power transmitted through the clutch from the engine shaft 18 to the transmission input shaft 22. The duty cycle of the PWM signal is the percentage of the cycle time for which the signal is activated or enabled. The output signal of the controller is communicated to a solenoid 122, which operates a valve 124 that opens and closes a source of fluid pressure 126 to the servo 88 of clutch 16. The clutch duty cycle is interchangeably referred to as a pressure command, or clutch command.

Controller 100 is preferably a microprocessor-based controller, which provides integrated control of engine 10 and transmission 12. The present invention may be implemented with a separate engine or transmission controller depending upon the particular application. Controller 100 includes a microprocessor MPU in communication with input ports, output ports, and computer readable media via a data/control bus 102. Computer readable media may include various types of volatile and nonvolatile memory such as random access memory (RAM), read-only memory (ROM), and keep-alive memory (KAM). These functional descriptions of the various types of volatile and nonvolatile storage may be implemented by any of a number of known physical devices including, but not limited to EPROMs, EEPROMs, PROMS, flash memory, and the like. Computer readable media include stored data representing instructions or algorithms executable by microprocessor MPU to implement the method for controlling input hydraulic pressure and motor torque according to the present invention.

Vehicle launch is commanded when the driver steps on the accelerator pedal and the vehicle is at rest or at a low speed. The pressure command to the input clutch 16 is the output of a closed loop controller 100, which controls the transmission input speed through an incremental PID controller. The set point for the controller 100 is a function of actual throttle position (TP_raw) and vehicle speed (VS). The launch controller also controls the magnitude of torque produced by the electric motor 14, a starter/alternator. The torque produced by motor 14 provides extra boost to the engine torque, and aids in vehicle launch feel and acceleration so that the launch is comparable to today's torque converter-equipped vehicles.

Figure 6:
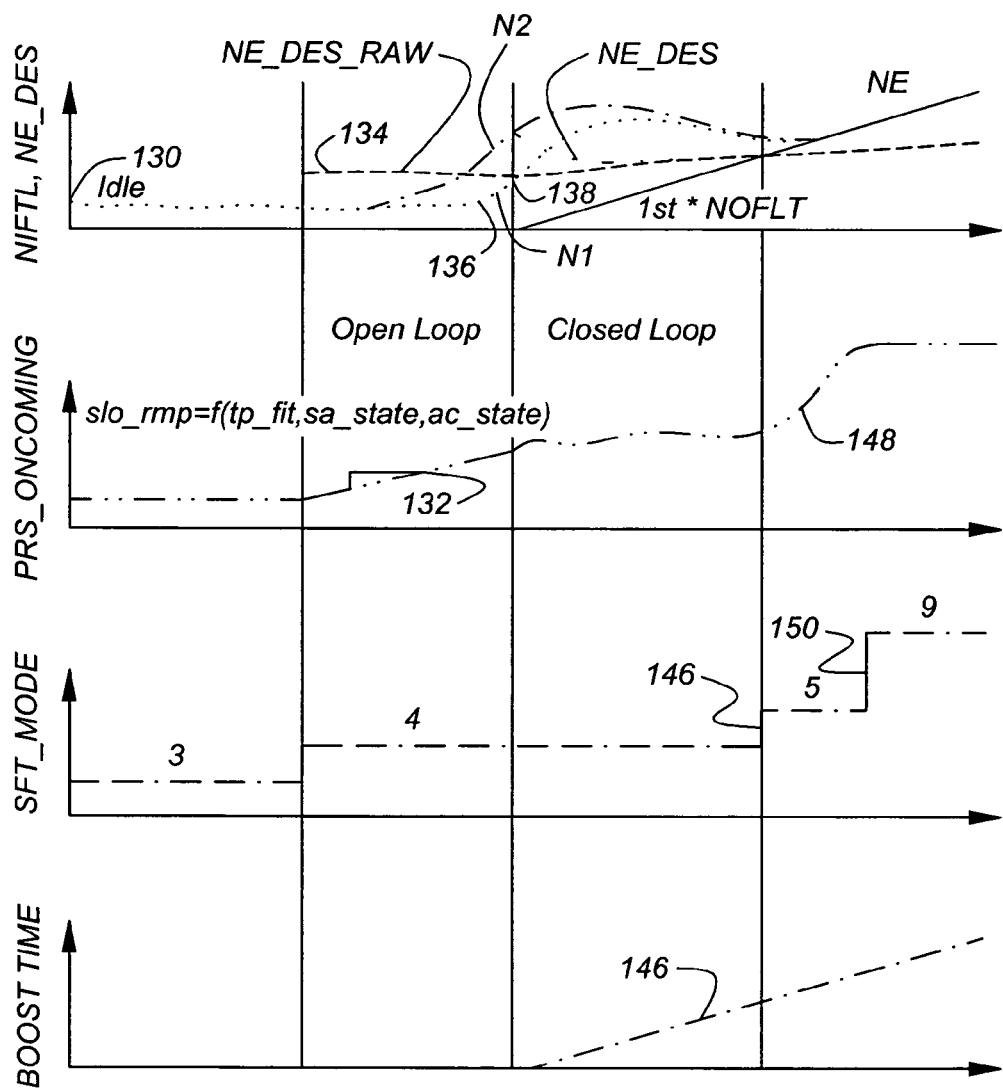
FIG. 6 is a graph showing the variation of boost, commanded clutch pressure, filtered input speed, and target engine speed during various progressive phases or modes of a vehicle launch controlled in accordance with this invention.

A torque converter's boost is limited to low speed, up to about 10 mph. However, the motor 14 can produce torque at relatively high motor speed and vehicle speed, as shown in FIG. 6. This torque producing ability improves launch performance time and feel by permitting boost to continue after the input clutch 16 is fully engaged and during operation in second gear.

There are two primary functions of the launch controller. One is to control the input clutch 16 such that it provides smooth torque delivery path to the wheels, while maintaining input speed. A second function of the controller is to control the output torque produced by the motor 14. The control strategy of this invention applies to a mechanical throttle, i.e., an engine control system in which a fixed relationship exists between the extent to which the accelerator pedal is depressed and the degree to which the engine throttle is open. The control strategy of this invention applies also to an electronic throttle control system, in which a sensor produces as input to a controller a signal representing the position of the accelerator pedal. The controller processes the signal and its variations with time to interpret the vehicle operator's desire for changes in engine and powertrain operation.

The time based implementation of the control strategy that produces the pressure command (prs_oncoming) to the solenoid 122 that controls clutch 16 is illustrated in FIG. 6. The vehicle is at rest in the forward drive range or reverse drive range (sft_mode=3) when a transmission range selector (PRNDL) is in the D or R position. Vehicle launch control is initialized when the vehicle operator depresses the accelerator pedal, i.e. increases TP, and the control enters sft_mode=4. When the launch controller is first called, it enters a short open loop phase. This is needed when coming from an idle condition 130 because the closed loop controller can actually decrease clutch pressure if the engine stumbles during the throttle transition or another event causes the engine speed to be less than the desired engine speed, which may cause an undesirable bump in the output torque. During this time, the pressure command is increased gradually along ramp 132 in accordance with an open loop parameter, slo_rmp, which is a function of filtered throttle position (TP_flt), motor state (SA_state), and the state of the air conditioner (AC_state). The function slo_rmp is stored in electronic memory accessible to the controller 100.

The desired engine speed, Ne_des_raw, 134 is set based on a function of throttle position. When the actual engine speed 136 exceeds the desired engine speed 134, the closed loop pressure controller is enabled at 138. If the engine speed (N1) is coming up normally, Ne_des is equal Ne_des_raw at the entry into closed loop. In case an unusual event, such as a neutral slam, causes the engine speed (N2) to be above Ne_des_raw, then Ne_des is filtered down to Ne_des_raw.

When input clutch 16 is nearly fully engaged or locked-up, sft_mode 5 is entered at 146, which causes an open loop parabolic increase 148 of commanded clutch pressure used to complete an upshift from first gear to second gear. After the clutch pressure is increased to its maximum magnitude, the pressure control is complete at 150, the sft_mode is set to 9 and the shift is completed.

Boost time 146 is a parameter that is used to control the length of time that the motor 14 adds torque. During a normal launch or drive-away, boost time is set to be sufficient to allow full boost during operation in first gear and second gear. In case the vehicle does not drive away as expected, the boost timer will expire. The motor stops adding boost to minimize thermal durability issues and to allow charging of the battery. The boost timer is also used to improve drivability. It is not desirable to boost after a downshift from third gear to second gear. This condition is avoided by setting the boost time.

Figure 7:
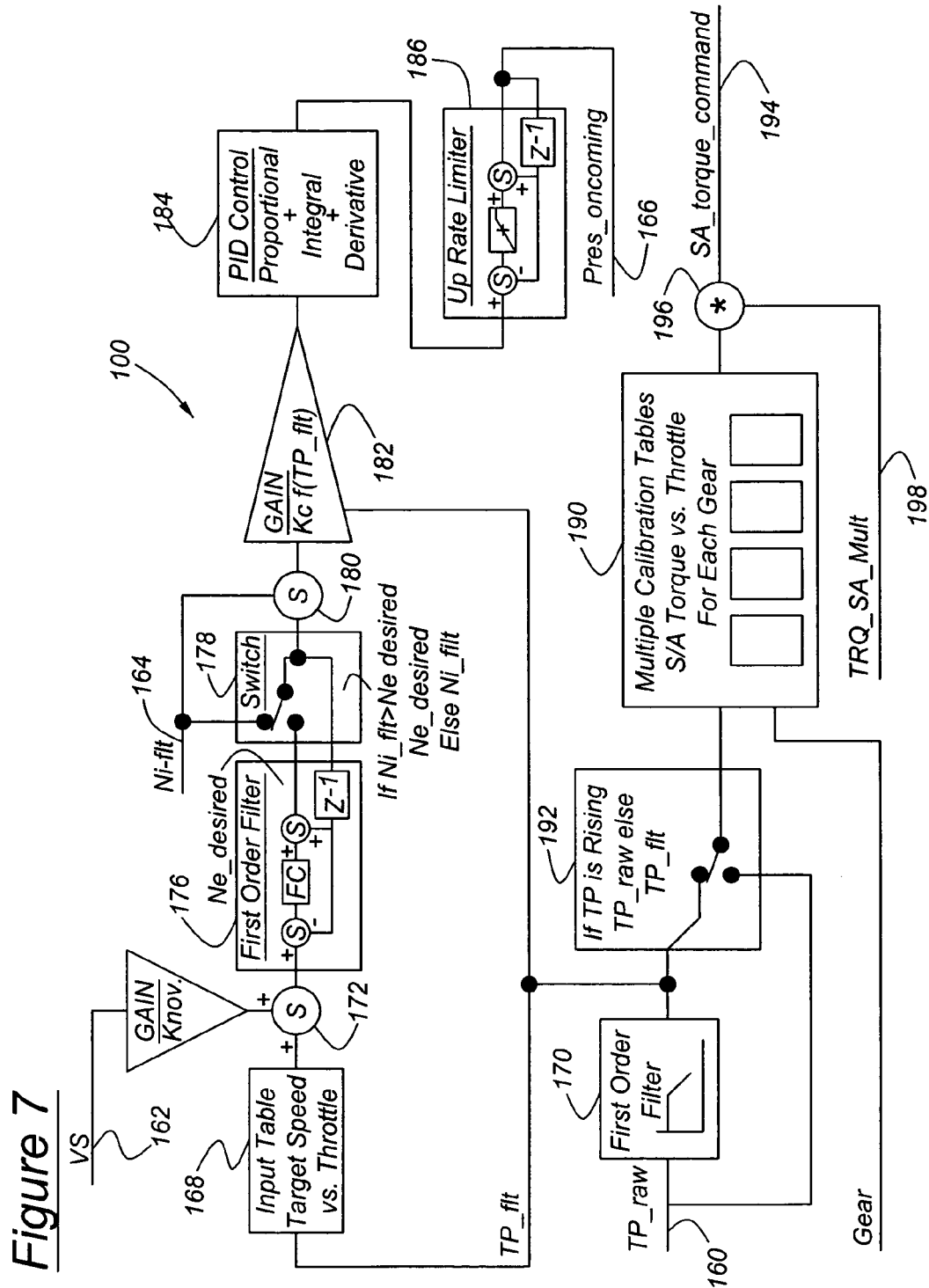
FIG. 7 is a schematic diagram of the controller for a converterless hybrid electric vehicle during launch and steps for controlling input clutch pressure and motor torque.

The launch controller is illustrated schematically in FIG. 7. Two controllers are used: a closed loop pressure controller and an open loop motor torque controller. For the closed loop pressure controller, the input parameters are throttle position (TP_raw) 160, vehicle speed (VS) 162 and transmission input speed (Ni_flt) 164. The output 166 is the pressure command (prs_oncoming) to the input clutch 16.

A target input speed is determined from a lookup table 168, which is a function of current filtered throttle position TP_flt, the output from a first order filter 170, whose input is TP_raw. The target input speed is target is added at a summing junction 172 to a factor of VS multiplied at 174 by the gain Knov to provide a target input speed that allows the engine speed to increase as the vehicle accelerates to provide a more natural experience for the driver.

Target input speed is then filtered through a low-pass first order filter 176 to determine Ne_desired. For drivability, the input speed should always be greater than the target input speed because the controller attempts to keep the input speed down by controlling the load on the engine/motor. A switch 178 sets the feedback to the filter 176 and an input to the summing junction 180 to Ni_flt instead of Ne_desired whenever the actual speed Ni_flt is lower than the target input speed Ne_desired.

After switch 178, Ni_flt is subtracted from Ne_desired to obtain the error at summing junction 180. This error is then multiplied at 182 by the gain Kc. Kc is a proportional function of TP_flt because it is necessary to have higher gains at higher speeds. The output of this gain 182 is multiplied by an incremental Proportional+Integral+ Derivative controller 184. The proportional term is dominant since steady state error is not critical to driveline smoothness, but maintaining very tight control on speed can cause transients in the pressure of clutch 16 pressure, which can be felt by the driver and passengers. Fast increases in pressure can cause drivability problems, so the output of the PID controller is rate limited at 186 in the up direction to limit the rate of increase in the pressure of clutch 16. The controller issues a pressure command 166 to the solenoid 122, and the state of engagement or torque transmitting capacity of clutch 16 changes in response to that command.

In the open loop control for the motor torque command, calibration tables 190 are used to determine the desired torque magnitude produced by motor or starter/alternator 14. These tables are a function of throttle position, and there is a table for each of the forward gears. The controller determines the current gear from signals produced by sensors whose output represents the speed of the input shaft 22 and the transmission output 56, 58.

When the throttle position is increasing, switch 192 sets TP_raw directly as an index to tables 190 to provide a fast response to the demand. When TP is decreasing, switch 192 sets TP_flt as the index to tables 190. To provide a natural acceleration feel, different calibration tables are used in each gear. The commanded magnitude of motor torque, SA_torque_command, 194 is highest in first gear, and lower in second gear. It is calibrated so that boost is not increased in third gear and fourth gear, although it is possible to add boost in those gears also.

Figure 8:
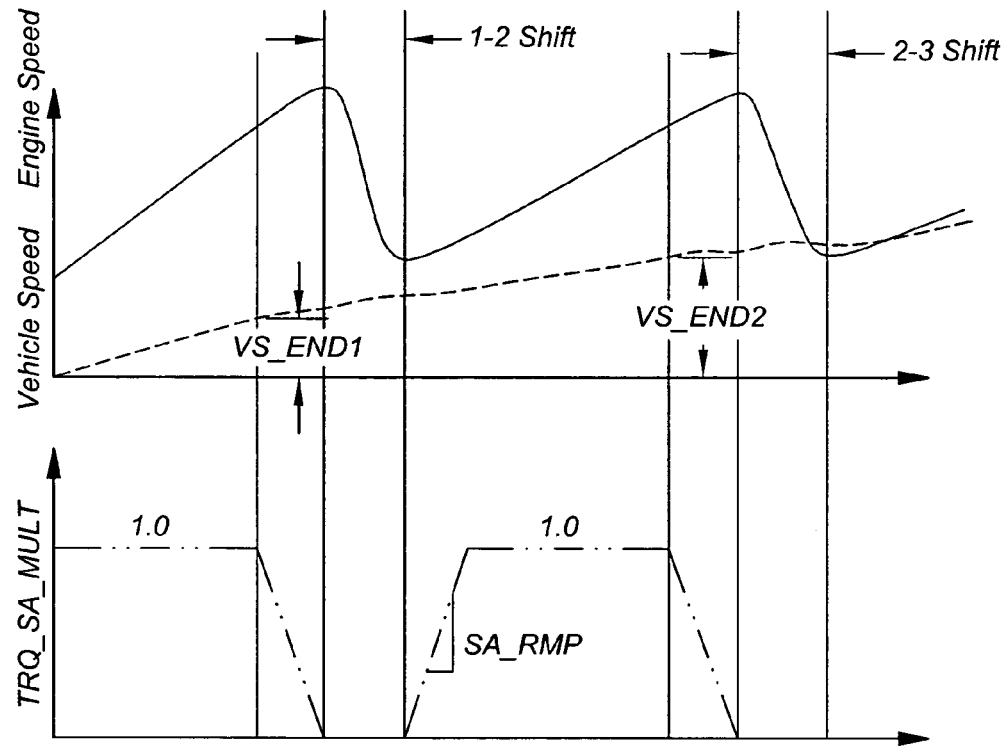
FIG. 8 is a graph showing the variation of boost, vehicle speed and engine speed before during and after a 1-2 and 2-3 upshifts during a vehicle launch controlled in accordance with this invention.
Figure 9:
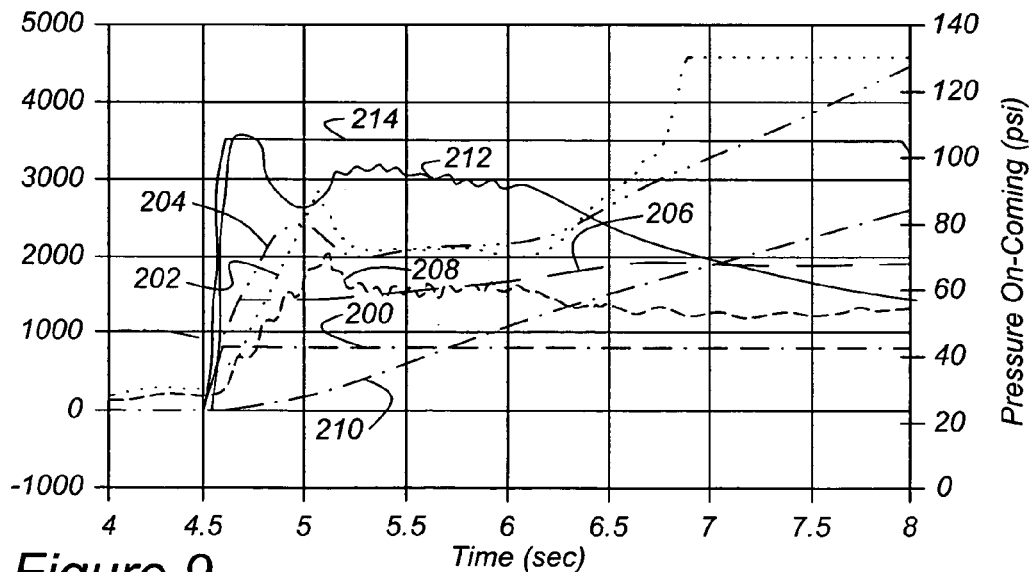
FIG. 9 shows the variation of various vehicle and power train parameters during a vehicle launch at wide open throttle.

The output of the tables 190 is multiplied at 196 by TRQ_SA_Mult 198 to produce the motor commanded torque, SA_torque_command. The multiplier TRQ_SA_Mult, graphically shown in FIG. 8, is used to turn the motor off prior to a gear ratio change. TRQ_SA_MULT is equal to 1.0 until vehicle speed reaches VS_END1, which occurs in sufficient time before the 1-2 gear shift at launch to assure that the commanded motor torque is zero when the gear shift begins. The length of the period during which TRQ_SA_MULT ramps down from 1.0 to zero is in the range 0.5–1.0 seconds. After the 1-2 upshift is completed, TRQ_SA_MULT is ramped back to 1.0. The same technique is used before the 2-3 upshift from second gear to third gear.

Preferably the motor 14 is a multi-pole synchronous induction motor. The rotor is of the laminated squirrel cage type. The output torque is controlled by the magnitude of current applied to the field windings. The commanded output torque signal, SA_torque_command, produced by the controller changes the magnitude of current applied to the field windings in response to the command to produce the commanded output torque.

A vehicle launch with the accelerator pedal fully depressed causing the throttle position 200 to become wide open throttle. The launch begins at time equal to 4.5 seconds. The open loop control briefly increases clutch 16 pressure on a ramp 202 until the closed loop control begins at time=4.65 sec. Initially, the rate of clutch pressure increase is clipped by the rate limiter 186 until just over time=5 sec. Some engine flare is allowed during this time. This flare keeps the engine speed 204 above the desired speed 206 in order to provide extra inertia torque when the engine speed is pulled down. This feature of the control produces a wheel torque 208 having a shape similar to that produced by a torque converter. The PID controller is tuned to keep the engine speed smooth by allowing the offset error rather than forcing a sudden change that holds tight speed control. As vehicle speed 210 increases, the target speed 206 is increased proportionally. Boost torque 212 from the motor 14 is commanded to 70 ft-lbs. As the speed of the motor increases, the motor becomes power limited so that at WOT the commanded torque 214 is not achieved. Ideally, at WOT the torque produced by the motor is at its maximum torque capacity. At lower throttles, the torque command is lower and the motor is able to provide it.

Figure 10:
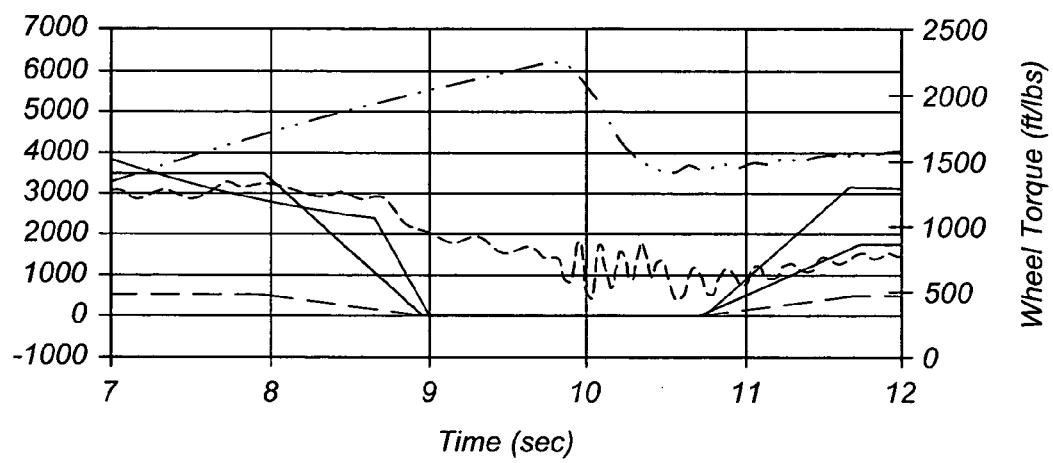
FIG. 10 shows the operation of the multiplier to the motor torque command controller during a wide open throttle 1-2 gear shift.

FIG. 10 shows the operation of the multiplier to the motor torque command controller (TRQ_SA_Mult) 198 during a wide open throttle 1-2 gear shift. At time=8 sec, the vehicle speed reaches VS_CMD1 and TRQ_SA_Mult ramps down from 1.0 to during one second before the start of the 1-2 shift. With the multiplier at zero, the commanded motor torque is also zero. After the 1-2 shift is completed, the multiplier TRQ_SA_Mult is ramped up again over about one second to the value 1.0. This enables the torque boost produced by the motor 14 to continue in second gear. The one second ramps allow for a smooth transition in launch feel.

Figure 11:
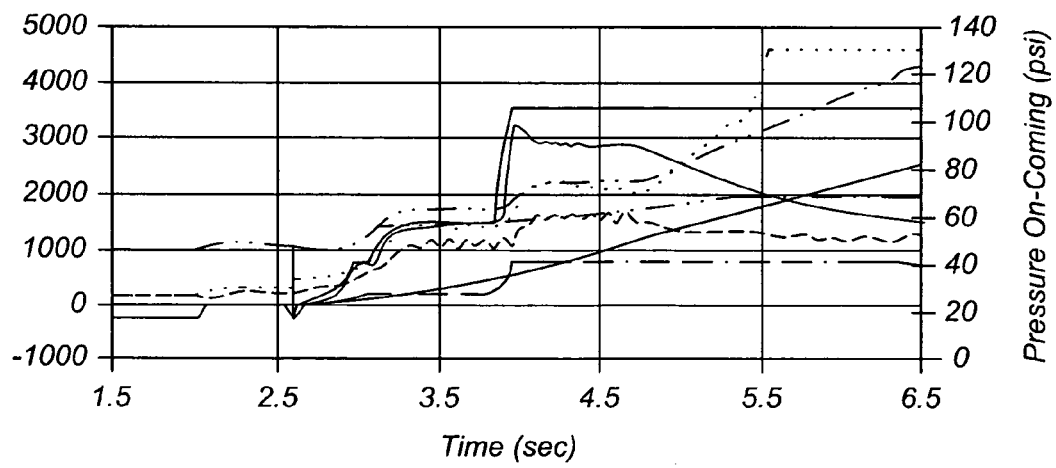
FIG. 11 illustrates the ability of the control strategy to effectively accommodate changes in driver demand. In the example, a change-of-mind maneuver by the operator is shown.

FIG. 11 illustrates the ability of the control strategy to effectively accommodate changes in driver demand. In the example, a change-of-mind maneuver by the operator is shown. The launch begins with the accelerator pedal at about 20 percent of its maximum range. The accelerator pedal is held at that position for about one second, then the pedal is fully depressed to the wide open throttle position. The control system smoothly and quickly controls the clutch pressure and SA boost to respond to this change to provide maximum vehicle acceleration.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for controlling a vehicle powertrain including a transmission having an input speed, an internal combustion engine having an output and a throttle position, and an input clutch having a variable torque capacity for driveably connecting the input and output, the method comprising the steps of:
   determining a current input speed;
   determining a value representing requested powertrain output;
   producing an indication that a vehicle launch condition has been initiated;
   determining a target input speed based on the value representing requested powertrain output;
   determining a variable pressure for actuating the input clutch during the launch condition based on a difference between the current input speed and the target input speed; and
   using the variable pressure to control the torque capacity of the input clutch during the launch condition.

2. The method of claim 1, further comprising the steps of:
   determining a current vehicle speed;
   determining a performance adder based on the current vehicle speed; and
   combining the performance adder with the target input speed before using the variable pressure to control the torque capacity of the input clutch.

3. The method of claim 1, wherein the step of producing an indication that a vehicle launch condition has been initiated further comprises the steps of:
   comparing the current input speed and the target input speed; and
   producing the indication when current input speed exceeds the target input speed.

4. The method of claim 1, wherein the transmission has a current gear, the method further comprising the steps of:
   determining the current gear in which the transmission is operating;
   determining a target motor output torque based on the current gear and throttle position; and
   using the target motor output torque to control the torque produced by the motor.

5. The method of claim 1, wherein the transmission has a current gear, the method further comprising the steps of:
   determining the current gear in which the transmission is operating;
   determining a target motor output torque based on the current gear and throttle position; and
   using the target motor output torque to control the magnitude of electric current applied to a field winding of the motor.

6. The method of claim 1, further comprising the steps of:
   determining a current vehicle speed;
   determining a performance multiplier based on the vehicle speed; and
   determining a target motor output torque as the product resulting from multiplying the performance multiplier and the target motor output torque based on the current gear and throttle position.

7. The method of claim 1 wherein the step of determining a value representing requested powertrain output comprises determining an engine torque based at least in part on a position of the accelerator pedal.

8. The method of claim 1 wherein the step of determining a value representing requested powertrain output comprises determining an engine torque based at least in part on a position of the engine throttle.

9. The method of claim 1, further comprising the steps of:
   determining whether the variable pressure is increasing; and
   limiting the time rate of increase of the variable pressure.

10. A method for controlling a vehicle powertrain including a transmission having an input speed, an internal combustion engine having an output and a throttle position, a motor, and an input clutch having a variable torque capacity for driveably connecting the input and output, the method comprising the steps of:
    determining a current input speed;
    determining a value representing requested powertrain output;
    producing an indication that a vehicle launch condition has been initiated;
    determining a target input speed based on the value representing requested powertrain output;
    determining a variable pressure for actuating the input clutch during the launch condition based on a difference between the current input speed and the target input speed;
    using the variable pressure to control the torque capacity of the input clutch during the launch condition;
    determining the current gear in which the transmission is operating;
    determining a target motor output torque based on the current gear and throttle position; and
    using the target motor output torque to control the torque produced by the motor.

11. The method of claim 10, further comprising the steps of:
    determining a current vehicle speed;
    determining a performance adder based on the current vehicle speed; and
    combining the performance adder with the target input speed before using the variable pressure to control the torque capacity of the input clutch.

12. The method of claim 10, wherein the steps of using the target motor output torque to control the torque produced by the motor further comprises using the target motor output torque to control the magnitude of electric current applied to a field winding of the motor.

13. The method of claim 10, further comprising the steps of:
    determining a current vehicle speed;
    determining a performance multiplier based on vehicle speed; and
    determining a target motor output torque as the product resulting from multiplying the performance multiplier and the target motor output torque based on the current gear and throttle position.

14. The method of claim 10 wherein the step of determining a value representing requested powertrain output comprises the step of determining an engine torque based at least in part on a position of the accelerator pedal.

15. The method of claim 10 wherein the step of determining a value representing requested powertrain output comprises the step of determining an engine torque based at least in part on a position of the engine throttle.

16. The method of claim 1, further comprising the steps of:

determining whether the variable pressure is increasing; and limiting the time rate of increase of the variable pressure.

17. A method for controlling a vehicle powertrain including a transmission having an input speed, an electric motor producing torque that drives the input, an internal combustion engine having an output and throttle position, an input clutch having a variable torque capacity for driveably connecting the input and output, and an electronic controller communicating with the transmission and motor, the method comprising the steps of:

repetitively determining the current input speed;

repetitively determining the engine throttle position;

generating a signal that a vehicle launch condition has been initiated;

repetitively determining a target input speed based on the engine throttle position;

repetitively determining a variable pressure for actuating the input clutch during the launch condition based on a difference between the current input speed and the target input speed; and generating a command to change a pressure at the input clutch based on the determined variable pressure, whereby torque capacity of the input clutch changes during the launch condition.

18. The method of claim 17, further comprising the steps of:

repetitively determining a current vehicle speed;

repetitively determining a performance adder based on the current vehicle speed; and repetitively combining the performance adder with the target input speed before using the variable pressure to control the torque capacity of the input clutch.

19. The method of claim 17, wherein the transmission has a current gear, the method further comprising the steps of:

repetitively determining the current gear in which the transmission is operating;

repetitively determining a target motor output torque based on the current gear and throttle position; and generating a command to change the torque produced by the motor based on the target motor output torque.

20. The method of claim 17 further comprising the steps of:

repetitively determining the current gear in which the transmission is operating;

repetitively determining a target motor output torque based on the current gear and throttle position; and generating a command to change the magnitude of electric current applied to a field winding of the motor the torque in response to the target motor output torque.

21. The method of claim 17, further comprising the steps of:

repetitively determining a current vehicle speed;

determining a performance multiplier based on vehicle speed; and determining a target motor output torque as the product resulting from multiplying the performance multiplier and the target motor output torque based on the current gear and throttle position.

22. The method of claim 17, further comprising the steps of:

repetitively determining whether the variable pressure is increasing; and limiting the time rate of increase of the variable pressure.

* * * * *